Dec. 30, 1952  E. C. WEISKOPF  2,623,977
ELECTRICALLY HEATED IMPLEMENT
Filed June 1, 1949
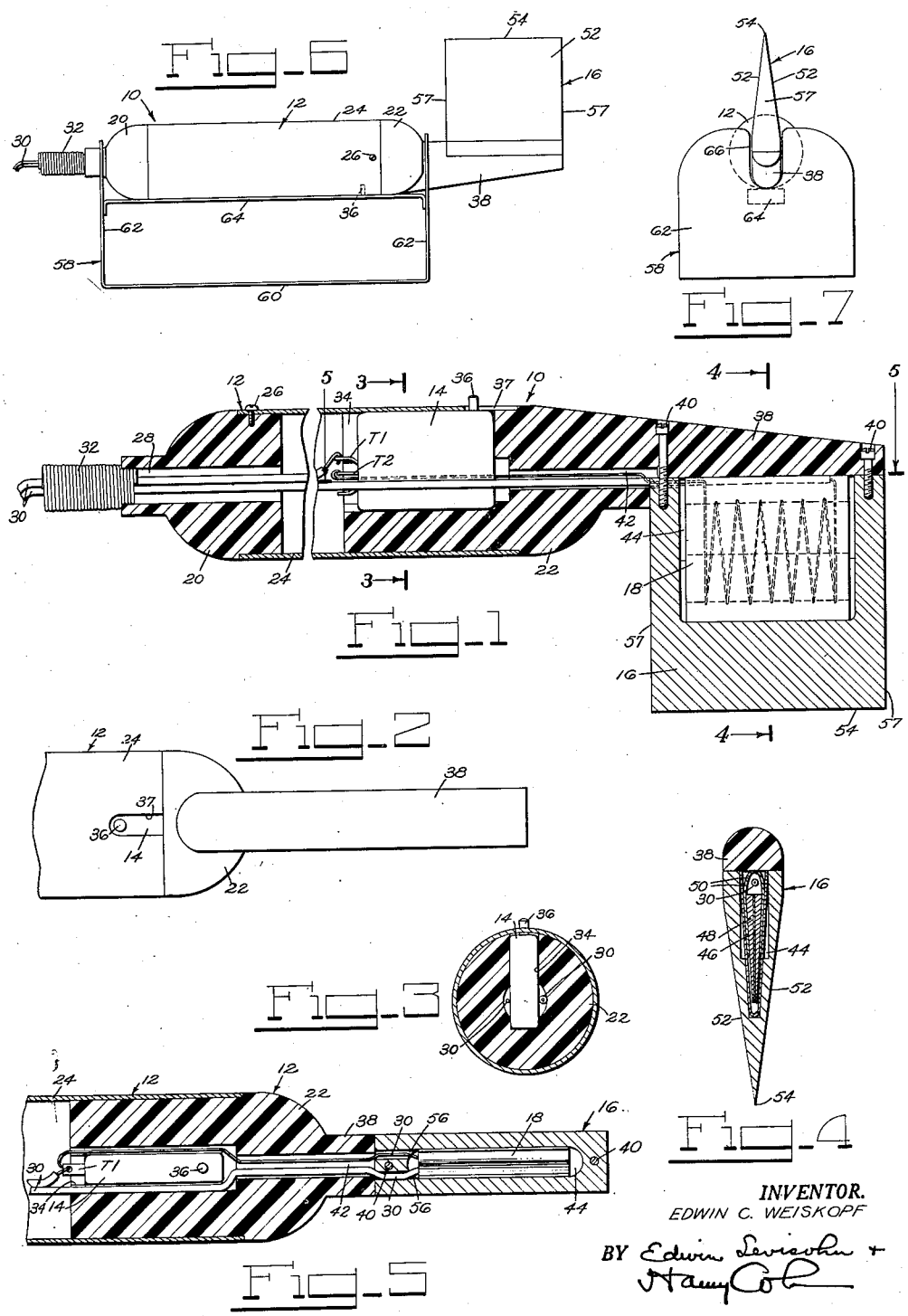
INVENTOR.
EDWIN C. WEISKOPF
BY Edwin Levisohn &
Harry Cohen
ATTORNEYS Patented Dec. 30, 1952

2,623,977

UNITED STATES PATENT OFFICE 2,623,977

ELECTRICALLY HEATED IMPLEMENT

Edwin C. Weiskopf, New York, N. Y., assignor to Technicon International, Ltd., New York, N. Y., a corporation of New York Application June 1, 1949, Serial No. 96,526

8 Claims. (Cl. 219—21)

This invention relates to an electrically heated implement or tool.

The main object of the invention is to provide an electrically heated implement or tool of improved construction and operation to facilitate the cutting and trimming of paraffin blocks, particularly in the laboratory by the pathological, histological or biological technician.

Another object is to provide a tool of the designated character with a control switch for the heating element mounted in a convenient position on the handle of the tool for operation by the user, the switch being biased to its open position so that the circuit of the heating element is broken unless the switch is held closed either by the user or when the tool is placed in a predetermined position on a holder designed for that purpose in accordance with a related object of the invention. Further, in accordance with this related object of the invention, the holder is so designed that the tool may be mounted thereon in positions in which the control switch is held closed or allowed to open, respectively.

A further object is generally to provide a tool which is of simple construction and of light weight and which is easy to handle and to operate for various purposes, especially in pathological, biological and chemical laboratories.

The above objects of the invention and other objects which might hereinafter appear will be more fully understood from the following description considered in connection with the accompanying drawing which illustrates the preferred embodiment of the invention.

In the drawings:

Fig. 1 is a longitudinal sectional view of the implement embodying the invention;

Fig. 2 is a plan view of a portion of the implement mounting the blade;

Fig. 3 is a sectional view taken on the line 3—3 of Fig. 1;

Fig. 4 is a sectional view taken on the line 4—4 of Fig. 1;

Fig. 5 is a sectional view taken on the line 5—5 of Fig. 1;

Fig. 6 is a side view of the implement positioned in the holder; and

Fig. 7 is a front end view of the implement positioned in the holder as in Fig. 5.

Referring now to the drawings in detail, the implement 10 embodying the present invention comprises a handle 12, a microswitch or other open-biased switch 14, a blade or knife 16 and a heating resistance unit or element 18. The handle comprises, as here shown, separate portions 20 and 22 formed of thermal and electrical insulation material, for example but without limitation wood or "Bakelite," and joined by a tubular section or member 24, preferably formed of stainless steel and secured thereto by screws 26 or other suitable means. Handle portion 20 is provided with a central passageway 28 through which the electric wires 30 enter the handle, the usual anti-fraying spring 32 being provided for said wires at the entrance to said passageway. Handle part 22 is provided with a recessed portion or seat 34 in which is disposed the normally open micro-switch 14 provided with the switch-operating part 36 which projects through slot 37 provided in the tubular section. Handle part 22 is also provided with an axially extending and preferably tapered portion or shank 38 to which blade 16 is secured by the countersunk screws 40, or by other suitable means. A passageway 42 is provided in part 38 for wires 30, one of said wires extending through passageway 28, through seat 34 and through passageway 42 to blade 16 for connection to one end of heating element 18, the other wire being connected to one terminal $T_1$ of switch 14, and extending from a second switch-terminal $T_2$ through passageway 42 to the other end of the heating element. It will be understood that switch 14 is an open-biased switch and that upon the depression of actuating element 36, said switch is closed in the usual manner to complete the circuit from a power source (not illustrated) to the heating element for heating blade 16. If preferred, a thermostat may be inserted in one of the wires for regulating the heat generated by the heating element.

Blade 16 is preferably formed of beryllium copper, but may be made of other suitable material, and is provided with the internal recess or seat 44 in which the heating element 18 is disposed. The latter is helically wound about a strip of mica 46, or other suitable electrical insulating material, and is secured thereto by porous electrical insulating material 48, the mica sheets 50 enveloping the latter material. Blade 16 is provided with the mutually inclined or converging sides 52 which provide relatively large heat dissipating surfaces and which meet in a relatively sharp cutting or operating edge 54. The substantially triangular front and rear end blade walls 57 provide additional heat transferring surfaces of smaller dimensions for use where sides 52 are too large. The blade is also provided, in its upper surface, with the axial slots 56 (Fig. 5) in which the wires 30 are disposed, said slots forming a passageway for said wires between the passageway 42 and the heating element.

A holder or stand 58 is provided for implement 10. Said holder may be formed of metal or other suitable material and comprises the base 60 and the opposing upstanding lateral walls 62 joined by a cross-member 64. Each lateral wall is provided with a cut-out or slotted portion 66 to form a seat therein for receiving a cooperating handle portion. With the switch 14, it will be apparent that the depression of element 36 will close the circuit from the current source through the heater element, as previously described. With wires 30 connected to the current source, it will be apparent that with element 10 positioned in holder 58 as shown in Fig. 6, with blade 16 extending upwardly from the holder, switch element 36 will abut cross-member 64 and will be thereby depressed by the weight of the tool to close the circuit through the heating element, and implement 10 may be left in this position until it is properly heated. Thereafter, implement 10 is used in the ordinary manner. It will be apparent that the positioning of implement 10 in holder 58 will avoid the accidental burning of a table, or desk, etc. since blade edge 54 will never touch the surface on which base 60 is disposed. If it is desired to continue to heat blade 10 while the implement is in use, the operator need only depress switch element 36 with his thumb while holding handle 12 in the usual manner. When the operator has finished with implement 10, he need only position it in holder 58, in reverse position to that shown in Fig. 6, that is, with switch element 36 in the uppermost position so that it is not depressed. In this manner, the circuit is retained open permitting the blade to cool. It will be apparent that wires 30 need not be disconnected from the power source and that the implement can be conditioned for use simply by turning it to the position shown in Fig. 6. It will be understood that micro-switch 14 can be wired for a normally closed condition, in which case the circuit would be opened by depressing part 36. In this case, tool 10 would be reversed from the position shown in Fig. 6 for heating blade 16 and would be retained in the illustrated position for cooling the blade.

While the implement may be put to numerous uses, it is especially advantageous for use in trimming paraffin blocks, separating paraffin blocks from object disks, attaching blocks to object disks, cutting large blocks of paraffin, separating cut sections or ribbons on water, making neat uniform blocks for filing purposes, and cutting blocks evenly and neatly when tissue is embedded en masse. The implement is also useful in any situation where it is desired to apply heat to an article, for example, for sealing specimens in museum jars, for melting wax or similar substances, etc. Numerous other uses will be found for the implement by the technician in the laboratory.

While I have shown and described the preferred embodiment of my invention, it will be understood that certain changes in the details of construction and in the arrangement of parts may be made therein without departing from the underlying idea or principles of the invention within the scope of the appended claims.

Having thus described my invention, what I claim and desire to secure by Letters Patent, is:

1. An electrically heated tool of the class described, comprising a blade provided with a cutting edge at the lower end thereof and having a recess formed therein between said lower end and the upper end thereof, said blade having an opening at said upper end in communication with said recess, an electric heating element positioned in said recess for heating said blade, said element being insertable in said recess through said opening and substantially filling said recess, and a handle secured to said blade, said handle having a portion in engagement with said blade at said opening therein, said portion completely overlying said opening for sealing said opening whereby to prevent the entrance of foreign matter into said recess, said recess and said heating element extending from said upper end into said blade and terminating closer to said lower end than to said upper end.

2. An electrically heated tool of the class described, comprising a blade having a cutting edge at one end thereof and an opening at the opposing end thereof, said blade having an internal recess formed therein and extending from said opening to terminate closer to said one end than to said opposing end, an electric heating element positioned in said recess and substantially filling the latter for heating said blade, and a handle provided with an axially extending portion, said portion being secured to said blade in position overlying said opening and constituting a closure therefor whereby to prevent the entrance of foreign matter into said recess.

3. An electrically heated tool of the class described, comprising a blade having a cutting edge at one end thereof and lateral external surfaces diverging outwardly from said edge and extending to the opposing end thereof, said blade having an internal recess formed therein, said recess being in vertical alignment with said cutting edge and being defined by lateral internal planar surface portions of said blade, said blade having an opening at said opposing end in communication with said recess, an electric heating element positioned in said recess for heating said blade, said element being insertable in said recess through said opening, and a handle secured to said blade, said handle having a portion in engagement with said blade at said opening therein, said portion completely overlying said opening for sealing said opening whereby to prevent the entrance of foreign matter into said recess.

4. An electrically heated tool of the class described, comprising a blade having a cutting edge at one end thereof and lateral external surfaces diverging outwardly from said edge and extending to the opposing end thereof, said blade having an internal recess formed therein, said recess being in vertical alignment with said cutting edge and being defined by lateral internal planar surface portions of said blade, said blade having an opening at said opposing end in communication with said recess, an electric heating element positioned in said recess for heating said blade, said element being insertable in said recess through said opening, and a handle secured to said blade, said handle having a portion in engagement with said blade at said opening therein, said portion completely overlying said opening for sealing said opening whereby to prevent the entrance of foreign matter into said recess, said recess extending from said opposing end toward said one end for greater than half the distance between said ends.

5. An electrically heated tool of the class described, comprising a metal blade provided with electrical heating means therein and having a cutting edge at one end thereof and lateral surfaces extending from said cutting edge to the opposing end thereof, and a handle provided with a portion secured in close abutting relation with said opposing blade end, said portion being formed of insulation material and completely covering said opposing end, said portion having opposing lateral surfaces which merge with said lateral blade surfaces, respectively, and constitute continuations thereof, whereby to expand the usable surface area of said tool.

6. An electrically heated tool of the class described, comprising a metal blade provided with electrical heating means therein and having a cutting edge at one end thereof and lateral surfaces extending from said cutting edge to the opposing end thereof, said opposing end having an opening defined therein for the insertion of said heating means into the blade, and a handle provided with a portion secured in close abutting relation with said opposing blade end, said portion being formed of insulation material, said portion completely overlying said opposing end and constituting a closure for the opening therein, said portion having opposing lateral surfaces which merge with said lateral blade surfaces, respectively, and constitute continuations thereof, whereby to expand the usable surface area of said tool.

7. An electrically heated tool of the class described, comprising a metal blade provided with electrical heating means therein and having a cutting edge at one end thereof and lateral surfaces mutually diverging from said cutting edge toward the opposing end thereof, said opposing end having an opening defined therein for the insertion of said heating means into the blade, and a handle provided with an extending portion formed of insulation material, securing means interengaging said handle portion and said blade for securing said portion in close abutting relation with said opposing blade end, said portion completely overlying said opposing end and constituting a closure for the opening therein, said portion having opposing lateral surfaces which merge with said lateral blade surfaces, respectively, and constitute continuations thereof, whereby to expand the usable surface area of said tool.

8. An electrically heated tool, comprising a blade having a recess formed therein, said blade having a cutting edge at the lower side thereof, the upper side of said blade having a peripheral opening defined therein in communication with said recess, an electric heating element positioned in said recess for heating said blade, said heating element being insertable in said recess through said opening, a handle having a portion formed of insulation material, said portion completely overlying said opening and constituting a closure therefor, and securing means interengaging said portion and the blade for securing said portion in close abutting relation with said upper side of the blade.

EDWIN C. WEISKOPF.

REFERENCES CITED

The following references are of record in the file of this patent:

UNITED STATES PATENTS

| Number | Name | Date |
|---|---|---|
| 1,249,464 | Nolen | Dec. 11, 1917 |
| 1,536,669 | Grant | May 5, 1925 |
| 1,658,884 | Cusick | Feb. 14, 1928 |
| 1,782,952 | Allgaier | Nov. 25, 1930 |
| 1,826,933 | Hazlett et al. | Oct. 13, 1931 |
| 1,890,262 | Pardew | Dec. 6, 1932 |
| 2,032,688 | Dart | Mar. 3, 1936 |
| 2,036,169 | Beleson | Mar. 31, 1936 |
| 2,110,985 | Jacobson | Mar. 15, 1938 |
| 2,206,994 | Zent | July 9, 1940 |
| 2,214,084 | Lovice | Sept. 10, 1940 |
| 2,250,602 | Pierce | July 29, 1941 |
| 2,491,708 | Bradley | Dec. 20, 1949 |
| 2,494,840 | Stephenson | Jan. 17, 1950 |
| 2,543,103 | Friesen | Feb. 27, 1951 |

FOREIGN PATENTS

| Number | Country | Date |
|---|---|---|
| 505,821 | France | Aug. 7, 1920 |
| 701,935 | France | Mar. 25, 1931 |